Patented Mar. 14, 1939

2,150,270

UNITED STATES PATENT OFFICE 2,150,270

REVIVIFICATION OF CATALYSTS FOR HYDROGENATION AND LIKE PROCESSES

Thomas Harold Durrans, London, and Bernard Thomas Dudley Sully, Ewell, England

No Drawing. Application August 4, 1937, Serial No. 157,448. In Great Britain October 8, 1936

5 Claims. (Cl. 23—238)

This invention relates to the use of nickel catalysts, more particularly in processes of hydrogenation of crotonaldehyde to butyraldehyde or butyl alcohol or butyraldehyde to butyl alcohol, the catalyst being in the form of an oil or like inert-liquid suspension of finely divided metallic nickel, preferably unsupported, that is, neither mounted nor spread on a supporting solid.

Catalysts of this kind are known which are formed by reducing, for example in situ in the oil or other medium of the catalyst suspension to be produced, a reducible compound of nickel which has been precipitated in an aqueous medium, for example from an aqueous solution of sulphate, nitrate, acetate or chloride of nickel by interaction thereof with an alkali carbonate.

The invention relates specifically and more especially to the use of catalysts of the kind referred to when produced in this manner, although it is not limited to the use of catalysts of this particular kind and manner of production. More particularly the invention concerns the use of such catalysts when produced in accordance with the process disclosed in the specification of British Patent No. 478,386, since the novel and advantageous effect achieved in the invention has been found to be very specially marked in the case where the catalyst used is a catalyst which has been prepared by this process.

The said process described in the specification of British Patent No. 478,386 meets a certain difficulty which has been experienced in the preparation of nickel catalysts of the above kind which have been formed by the method referred to of reducing a reducible compound of nickel which has been precipitated in an aqueous medium, for example from an aqueous solution of sulphate by means of an alkali carbonate. The difficulty referred to is that of ensuring on the one hand that the reaction in the step of precipitating the reducible compound of nickel from the initial solution of nickel sulphate or the like shall be carried to completion and on the other that the precipitated nickel compound shall be as free as possible from contaminating water soluble salts, it having been found that unless the said reaction is definitely carried through to completion and an absolute minimum of sodium sulphate or like contaminating water soluble salt is present in the precipitated nickel compound a serious impairing will result of the activity of the catalyst ultimate produced in the process, and in addition, it will be practically impossible to ensure complete uniformity of the activity and useful properties generally of the catalyst from batch to batch thereof.

According to the process disclosed in the specification of British Patent No. 478,386, this difficulty is effectively met by submitting the aqueous mass of precipitated nickel compound and aqueous precipitating medium, in the presence of an excess of the precipitating agent, to fine particulation in a colloid mill, filtering the treated precipitate, and passing it repeatedly, with filtration and addition at each time of renewed wash water, through a colloid mill until substantially last traces of adsorbed water soluble salts have been removed from it. The resulting ultimately washed precipitate is then dried, ground in sulphur-free mineral oil or a like inert-liquid medium, and reduced in situ in this medium to metallic nickel. The nickel suspension thus formed may afterwards be submitted to further fine grinding, in order to ensure the formation of an ultimate product which shall be of an extremely fine degree of subdivision as regards the nickel component of the suspension.

The process is applicable to the preparation of mixed catalysts, for example, catalysts composed, prior to the step of activation, of a precipitated reducible compound of nickel in association with an additional substance or substances having the property of lowering the temperature at which the nickel compound reduces to metallic nickel or the property of retarding the growth of the crystals of precipitated nickel compound during the operations in the process following the precipitation step therein. In this event, the components of the mixed catalyst are co-treated in the colloid mill and may conveniently be co-precipitated, although this is not essential.

It is found that nickel catalysts of the kind to which this invention relates and in particular such catalysts when produced in the foregoing manner, that is, in accordance with the said process disclosed in the specification of British Patent No. 478,386, are specially active and otherwise serviceable in the hydrogenation of crotonaldehyde to butyraldehyde or butyl alcohol or butyraldehyde to butyl alcohol, and it is with their use in this particular connection that the present invention is more especially concerned, although it is to be clearly understood that it is not limited thereto.

It has been found that nickel catalysts of the kind referred to, in particular such catalysts when produced in accordance with the said process disclosed in the specification of British Patent No. 478,386 and more especially in cases of use of the catalyst in the hydrogenation of crotonaldehyde or butyraldehyde to butyl alcohol, are capable of reactivation after use, provided no permanent poisons have been introduced into them, by simply passing superheated steam through the well stirred suspension of catalyst in oil, the reduction process being reversible and the resulting nickel being oxidized by the steam to nickel oxide with the evolution of hydrogen, and then, upon cessation of the evolution of hydrogen, or prior thereto, cutting off the supply of steam and passing a suitable reducing gas, for example hydrogen, through the suspension so as to reduce the nickel oxide constituent therein to metallic nickel.

Such a reactivation process can be carried out at a constant temperature, which varies, however, with the type of catalyst. For instance, a catalyst incorporating hydroxide or basic carbonate of copper for the purpose of lowering the temperature at which the nickel compound of the oil or like suspension thereof reduces to metallic nickel in the step of the process of preparing the catalyst in which this reduction takes place, can be re-activated at a temperature of about 170–230° C., but a temperature up to 300° C. may be necessary in some cases with nickel alone. Generally speaking, in the case of reactivation of a catalyst which has been produced, as above, by reduction, for example in situ in the oil or other liquid medium of the suspension, of a reducible nickel compound, the reactivation temperature should be a temperature at or in the neighbourhood of the temperature at which the nickel was originally reduced.

It will be appreciated, therefore, that the present invention provides an exceedingly simple method of reactivating nickel catalysts of the kind referred to herein and one which can be applied without the necessity for lengthy and costly operations or the use of expensive reactivation plant. In addition, the reactivation process according to the invention eliminates the necessity for separating the suspended nickel catalyst from the oil or like medium of the suspension preparatory to the reactivation process, with the consequential necessity to re-incorporate the reactivated nickel with the oil or the like of the suspension. Further it is found that the process of reactivation which is provided by this invention is one which gives highly uniform results and that, without the necessity for an exceptionally close control upon the operating conditions other, of course, than a control of the reactivation temperature to suit the particular constitution of the catalyst under treatment.

The invention will now be further described with reference to the following specific example. In this example, which visualises the application of the invention to a catalyst in use in the hydrogenation of crotonaldehyde to butyraldehyde and butyl alcohol, the catalyst is one which has been produced in accordance with the process disclosed in the specification of British Patent No. 478,386. Thus, the catalyst is one which has been produced as follows:—

An aqueous solution of nickel sulphate and copper sulphate, containing 16% of nickel sulphate crystals ($NiSO_4.7H_2O$) and 0.7% of copper sulphate crystals ($CuSO_4.5H_2O$) is precipitated with a 10% aqueous solution of sodium carbonate, using an excess of sodium carbonate of about 15% over that required theoretically, and the resulting mixture consisting of precipitated nickel and copper compounds and aqueous medium, is passed, in the presence of the excess of precipitating agent, through a Premier type colloid mill at the temperature of precipitation of about 15° C. The precipitation reaction is thereby carried to completion and the resulting mixed precipitate of reducible nickel and copper compounds is filtered and stirred with 50 parts of water for every one part of nickel and copper (considered together) present until the particles are sufficiently small again to pass into the colloid mill. After passing the mixture through the mill it is again filtered and the water discharged. The process of passing the precipitated material through the mill with 50 parts of water is repeated say six times so that finally the sulphate content of the wash water is, as sodium sulphate, reduced to about 0.0001%. The wash waters may be stored for re-use in a countercurrent manner and if desired part of the washing may be carried out by passing water through the filter cake. The washed cake is dried at about 40° C., either in a current of air or in a partial vacuum, and when it ceases substantially to lose weight it is ground with about 10 times its weight of white mineral oil, using for this operation a cone mill of the type normally used in the manufacture of paint, the mineral oil used having an initial boiling point of not less than 360° C. and being free from catalyst poisons. The resulting ground paste should contain no particles visible to the eye and should not feel gritty when rubbed between the fingers. The oil paste is now heated to about 230° C. in a current of hydrogen for about 4 hours until the evolution of water almost ceases. After cooling in a current of hydrogen the catalyst is ready for use. If necessary, in order to increase the activity of the catalyst the oil suspension may be submitted to further grinding in the paint mill.

In the use of the catalyst, in the process of hydrogenation, about 5% by weight, calculated as metallic nickel and metallic copper, are added to aqueous crotonaldehyde such as the oil layer separating from the crotonaldehyde-water azeotrope obtained according to Example I of the process described in the specification of British Patent No. 370,252. Complete conversion to butyraldehyde ensues at room temperature and at a temperature not exceeding 40° C. and at a pressure of 70 to 80 lbs. per square inch, complete hydrogenation to butyraldehyde is attained in about 90 minutes. On raising the temperature the same catalyst will continue to catalyse the hydrogenation to butyl alcohol and with a final temperature kept below 100° C. complete conversion can be obtained with a yield of over 90% by weight. The complete conversion of crotonaldehyde to butyl alcohol takes about four to five hours, provided there is sufficient intimacy between the hydrogen and liquid undergoing hydrogenation.

The butyl alcohol may be separated from the catalyst and mineral oil by heating with stirring to about 110° C. and passing through the mass a current of steam. The butyl alcohol so obtained is free from any trace of crotonaldehyde and contains less than 0.5% of butyraldehyde. When all the butyl alcohol has been steamed off the catalyst remains as a suspension in mineral oil.

In accordance with the present invention, the catalyst is then reactivated by raising the temperature of the oil suspension to about 230° C. while passing dry or superheated steam through it until the evolution of hydrogen ceases or nearly so, then replacing the steam with hydrogen and passing this gas until the production of water ceases or substantially ceases; the suspension of catalyst in the oil is then preferably reground before re-use, or it may if desired be used without regrinding.

This application is a continuation-in-part of our abandoned application Serial No. 116,234, filed December 16, 1936.

What we claim as our invention and desire to secure by Letters Patent of the United States is:—

1. A method of reactivating after use a nickel catalyst in the form of an inert-liquid suspension of finely particulated metallic nickel, which consists in passing superheated steam through the used catalyst suspension so as to convert the nickel therein to nickel oxide and then reducing the nickel oxide thus formed to metallic nickel by treating the suspension with a reducing agent, throughout the steam treatment and subsequent reduction, the catalyst remaining suspended in the suspension medium.

2. A method of reactivating after use a nickel catalyst in the form of an inert-liquid suspension of finely particulated metallic nickel, which consists in passing superheated steam through the used catalyst suspension so as to convert the nickel therein to nickel oxide and then reducing the nickel oxide thus formed to metallic nickel by passing a gaseous reducing agent through the suspension, throughout the steam treatment and subsequent reduction, the catalyst remaining suspended in the suspension medium.

3. A method of reactivating after use a mixed nickel catalyst in the form of an inert-liquid suspension of finely particulated metallic nickel in admixture with at least one other metal, which consists in passing superheated steam through the used catalyst suspension so as to convert the nickel therein to nickel oxide and then reducing the nickel oxide thus formed to metallic nickel by passing a gaseous reducing agent through the suspension, through the steam treatment and subsequent reduction, the catalyst remaining suspended in the suspension medium.

4. A method of reactivating after use a nickel catalyst in the form of an inert-liquid suspension of finely particulated metallic nickel, the nickel having been formed by reduction of a reducible compound of nickel along with a substance having the property of lowering the temperature at which the nickel compound reduces to metallic nickel, which consists in passing superheated steam through the used catalyst suspension so as to convert the nickel therein to nickel oxide and then reducing the nickel oxide thus formed to metallic nickel by passing a gaseous reducing agent through the suspension, through the steam treatment and subsequent reduction, the catalyst remaining suspended in the suspension medium.

5. A method of reactivating after use a nickel catalyst in the form of an inert-liquid suspension of finely particulated metallic nickel, the nickel having been formed by reduction of a reducible compound of nickel which has been precipitated along with a substance having the property of retarding the growth of crystals of the nickel compound, which consists in passing superheated steam through the used catalyst suspension so as to convert the nickel therein to nickel oxide and then reducing the nickel oxide thus formed to metallic nickel by passing a gaseous reducing agent through the suspension, through the steam treatment and subsequent reduction, the catalyst remaining suspended in the suspension medium.

THOMAS HAROLD DURRANS.
BERNARD THOMAS DUDLEY SULLY.